US006839737B1

(12) United States Patent
Friskel

(10) Patent No.: US 6,839,737 B1
(45) Date of Patent: Jan. 4, 2005

(54) MESSAGING SYSTEM FOR INDICATING STATUS OF A SENDER OF ELECTRONIC MAIL AND METHOD AND COMPUTER PROGRAM PRODUCT THEREFOR

(75) Inventor: James Friskel, Cocoa Beach, FL (US)

(73) Assignee: Neoplanet, Inc., Tempe, AZ (US)

( * ) Notice: Subject to any disclaimer, the term of this patent is extended or adjusted under 35 U.S.C. 154(b) by 775 days.

(21) Appl. No.: 09/620,171

(22) Filed: Jul. 19, 2000

(51) Int. Cl.$^7$ .............................................. G06F 15/16
(52) U.S. Cl. .................. 709/206; 709/203; 709/224; 707/10
(58) Field of Search ................... 709/200–203, 709/206–207, 223–224, 238, 250, 227–229; 707/10

(56) References Cited

U.S. PATENT DOCUMENTS

| | | | | |
|---|---|---|---|---|
| 5,675,733 A | | 10/1997 | Williams ................. | 709/206 |
| 5,689,642 A | * | 11/1997 | Harkins et al. ........... | 709/207 |
| 5,764,916 A | | 6/1998 | Busey et al. | |
| 5,778,178 A | | 7/1998 | Arunachalam | |
| 5,859,971 A | | 1/1999 | Bittinger et al. | |
| 5,872,925 A | | 2/1999 | Han ........................ | 709/206 |
| 5,878,219 A | | 3/1999 | Vance, Jr. et al. | |
| 5,956,486 A | * | 9/1999 | Hickman et al. ......... | 709/206 |
| 5,999,932 A | * | 12/1999 | Paul ........................ | 707/10 |
| 6,108,688 A | * | 8/2000 | Nielsen .................... | 709/206 |
| 6,212,553 B1 | | 4/2001 | Lee et al. ................. | 709/206 |
| 6,249,805 B1 | * | 6/2001 | Fleming, III ............. | 709/206 |
| 6,501,834 B1 | * | 12/2002 | Milewski et al. ........ | 709/206 |
| 6,606,647 B2 | * | 8/2003 | Shah et al. ............... | 709/206 |
| 6,640,230 B1 | * | 10/2003 | Alexander et al. ....... | 707/10 |
| 6,760,752 B1 | * | 7/2004 | Liu et al. ................. | 709/206 |

OTHER PUBLICATIONS

ZDNET, ZDNet: Business & Tech: Netscape browser slims down, open up, web–site manual document at /enterprise/stories/main/0,10228,2522773,00.html, Apr. 17, 2000.
NETSCAPE, Netscape 6 Preview Release 1 Data Sheet, web–site manual document at wysiwg//21/browser/6/datasheet/index.html, Jun. 30, 2000.
NETSCAPE, Netscape 6 PR 1, web–site manual document at wysiwg//15/browser/6/datasheet/index.html?cp=seapod, Jun. 30, 2000.
NETSCAPE, Netscape 6 Preview Release 1, web–site manual document at download/previewrelease.html?cp=hom06t7, Jun. 30, 2000.
AOL, About AOL Instant Messenger, web–site manual document at /aim/about.html, Jun. 30, 2000.
NETSCAPE, Netscape 6 Preview Release, web–site manual document at /eng/mozilla/ns6/relnote/.

* cited by examiner

Primary Examiner—Bharat Barot
(74) Attorney, Agent, or Firm—Morgan, Lewis & Bockius LLP

(57) ABSTRACT

An electronic mail computer program running as a client application permits a user to determine in a single user interface application window, for example an "in-box," the on-line status of those persons who have sent e-mail messages to the user. Once such a sender has been identified as being currently on-line and available for real-time messaging, the user may use the same application window to initiate real-time messaging with the sender. The client application cooperates with a messaging system server that manages and provides the on-line state of senders of electronic mail to the user's client computer, including for example the following states: on-line, off-line, do-not-disturb, and accepting real-time messaging.

25 Claims, 8 Drawing Sheets

104

| APPROVED CONTACT ALIAS | E-MAIL ADDRESS | CONTACT STATUS |
|---|---|---|
| Sue | sue@salem.com | on-line |
| Big Guy | bill@hill.com | off-line |
| Jean | jean@table.com | on-line |
| Catherine | carol@roof.com | do not disturb |
| Green Dog | john@cement.com | accepting chat |
| User Alias | user@client.com | accepting chat |
| Cowboy | cowboy@cowboy.com | on-line |
| Sleepy | sleepy@sleepy.com | accepting chat |
| Sender Alias | sender@sender.com | accepting chat |

FIG. 4

MESSAGING SYSTEM FOR INDICATING STATUS OF A SENDER OF ELECTRONIC MAIL AND METHOD AND COMPUTER PROGRAM PRODUCT THEREFOR

BACKGROUND

The present invention relates to electronic mail application systems in general and more particularly to an electronic mail ("e-mail") application for indicating the status of the sender of an electronic mail message in a single, integrated incoming message status window or in-box.

E-mail software client applications are in widespread use for sending and receiving e-mail messages, in particular, on the Internet. One limitation, however, of such e-mail applications is that they are not designed for facilitating instantaneous two-way communication or real-time messaging with another computer connected, for example, to the Internet. Instead, prior e-mail applications only provide a list of new messages received in an in-box for review by the client application. There is no mechanism built into prior e-mail applications for determining or tracking the on-line status of any of the senders of the new messages or the real-time availability of the senders for entering real-time messaging or communications with the user. Further, prior e-mail applications do not include a means for determining the membership of the senders of new messages in any instant messaging systems or related standards, whether proprietary or non-proprietary. The typical means that a user of an e-mail client application has for communicating with the sender involves a significant lag time due to the need for a reply e-mail message to be sent using standard e-mail protocols such as those used on the Internet, and the delay that arises from waiting for the recipient of the reply e-mail to check the recipient's e-mail server using the recipient's e-mail application.

Instant messaging systems exist for providing real-time communication between users operating different computers connected over, for example, the Internet. These instant messaging systems provide real-time communication not possible with dedicated e-mail applications. Examples of currently-available instant messaging systems include America On-Line's instant messaging system and the NET-CLUBS system offered by Valent Software. Although instant messaging systems permit real-time communication, existing systems must be operated by the user from a dedicated application or dedicated window within another application, which must be separately launched or accessed in order to determine those other users that are members of the instant messaging system and/or that are available for real-time interactive communication such as by so-called "chat" communication or otherwise. Also, other users may be members of different instant messaging systems, in which case the user will need to check two or more instant messaging applications to determine whether other users are available for chatting. Because a user will typically only check a limited number of status windows such as, for example, the in-box of the user's preferred e-mail application, the user may miss or not be aware that other users are available for real-time messaging.

It would be desirable for a user to be able to quickly and conveniently determine in a single status window, such as an in-box, the availability of all other users which have electronically contacted the user, for example, by sending an e-mail, and that are currently available for real-time messaging. Under existing approaches, a user must learn two or more different applications with varying user interfaces in order to track the on-line messaging status of other users. Another limitation of existing approaches is that a user often may not be able to recognize that a particular sender of an e-mail message is also a member of an instant messaging system to which the user also belongs. This can occur, for example, because the sender of an e-mail message may use a different name or alias for interacting on an instant messaging system. Instead of using multiple applications to manage communications with other users, it would be desirable to use a single application by which a user could quickly and conveniently reply to a sender of an e-mail using standard e-mail protocols or entering into a real-time messaging session with the sender.

Accordingly, there is a need for an electronic mail application that integrates in a single interface window the updating of status information regarding senders of e-mail messages received by the user and that displays the status for each sender of an incoming message based on the current availability of the sender for real-time messaging.

BRIEF DESCRIPTION OF THE DRAWINGS

FIG. 4 illustrates the contents of a messaging system contacts file stored on a messaging system server of the messaging system of FIG. 1;

DETAILED DESCRIPTION OF THE PREFERRED EMBODIMENTS

The present invention generally provides an e-mail software application and method of operation therefor that permits an end user of the application to determine in a single user interface application window, for example an "in-box", the on-line status of those persons (such persons are generally referred to herein as "senders") who have sent e-mail messages (also referred to herein as simply "e-mails") to the user. Once such a sender has been identified as being currently on-line and available for real-time messaging, the user may use the same application window to initiate real-time messaging with the sender.

The e-mail application is a computer program that runs on a client computer that is part of a messaging system including a messaging system server, which manages status information for senders that are part of the messaging system. The status of a sender generally refers to the state or relationship (for example, whether currently on-line or off-line) of the sender relative to the sender's computer. The client computer is in regular, periodic communication with the messaging system server. Further, the computers used by senders to send e-mail messages to the client computer are also typically in regular, periodic communication with the messaging system server. The foregoing communications enable the messaging system server to determine and provide appropriate status information for each sender of an e-mail to the e-mail application.

Figure 1:
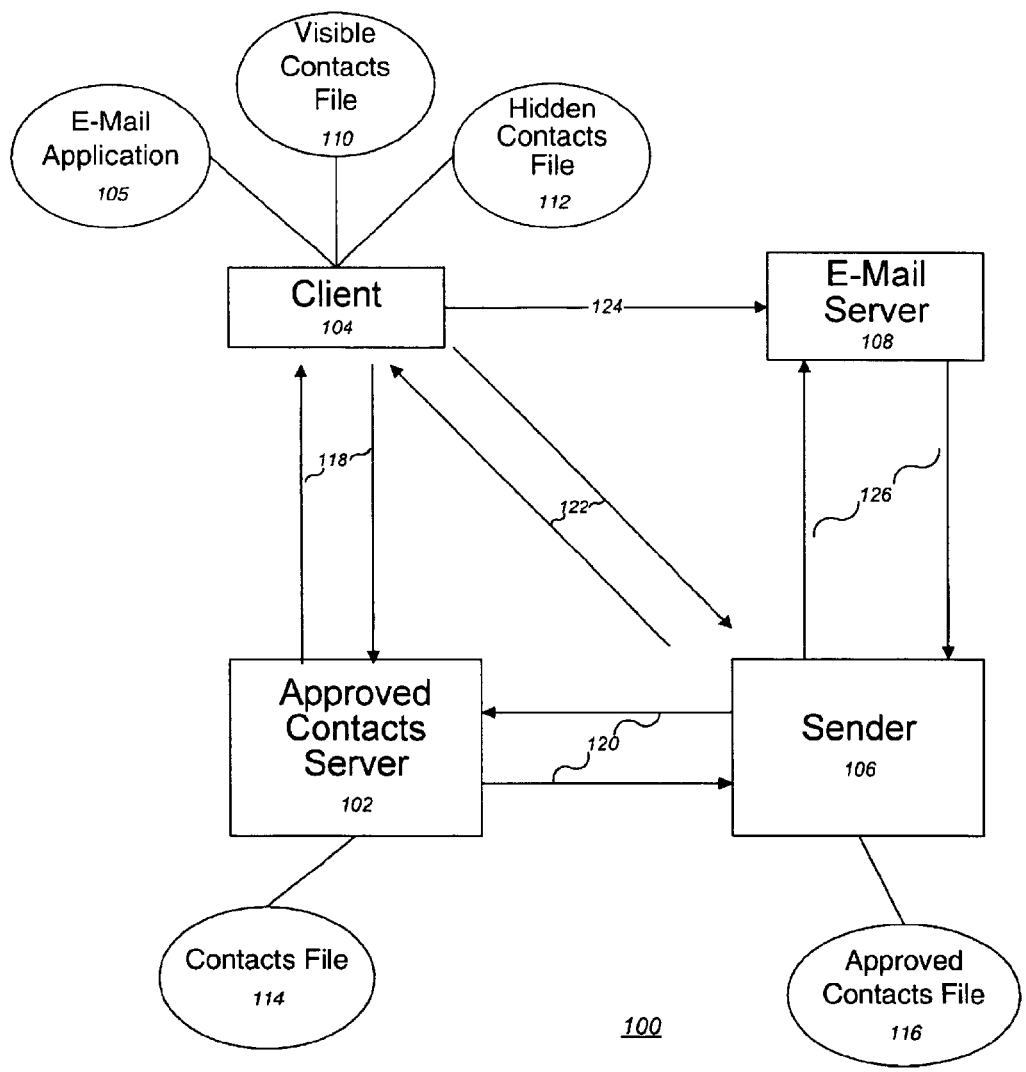
FIG. 1 illustrates a messaging system, for indicating the status of a sender of an e-mail message, according to the present invention.

The above features and other inventive features of the present invention are described below with reference to specific embodiments as illustrated in the figures listed above. More specifically, as shown in FIG. 1, according to the present invention, a messaging system 100 is provided to enable the determination and indication of the status of a sender of an e-mail message. Messaging system 100 comprises messaging system server 102, client computer 104, sender computer 106, and electronic mail server 108. The user of client computer 104 is sometimes referred to herein as the "client user". E-mail application 105 is stored on and runs on client computer 104.

A messaging system contacts file 114 is stored on messaging system server 102 and contains a list of the members of the real-time messaging system managed by server 102, including an alias selected by each member, as discussed further below. Visible contacts file 110 and hidden contacts file 112 are stored on client computer 104. Hidden contacts file 112 contains a list of messaging system members received from server 102 including the status information for each listed member as provided by server 102. Hidden contacts file 112 corresponds to that portion of the members of messaging system 100 that have given the user of client computer 104 permission to receive their on-line status information, as discussed further below. Accordingly, hidden contacts file 112 will in general include only a portion of all such members. The contents of hidden contacts file 112 are not visible to the client user during the operation of e-mail application 105.

Visible contacts file 110 contains a list of aliases for those members of messaging system 100 that have been selected by the client user as being approved contacts eligible to receive status information about the client user. The alias is that name by which each such member has selected to be known by other members. Visible contacts file 110 does not contain personally-identifiable information associated with each member, for example, as contained in hidden contacts file 112. Instead, only a list of aliases is actually visible to the client user. This maintains the privacy of each member's on-line status and other personal information such as, for example, a member's e-mail address.

Approved contacts file 116 is stored on sender computer 106 and contains a list of aliases for members for which the sender using sender computer 106 has given permission to obtain on-line status information about the sender. Approved contacts file 116 is periodically sent to server 102 and is used along with similar alias information sent by other senders for determining the list of members to be sent to client computer 104 and stored as hidden contacts file 112. Approved contacts file 116 is visible to the sender, but other information regarding such members is not accessible by the sender.

Servers 102 and 108 and computers 104 and 106 are interconnected by standard communications protocols, for example by conventional Internet-based protocols. More specifically, arrows 118 correspond to communication between client computer 104 and server 102 for requesting and providing member information for hidden contacts file 112. Arrows 120 correspond to communication between sender computer 106 and server 102 regarding providing updates of approved contacts file 116 and information regarding the current on-line status of the sender.

Arrows 124 and arrows 126 correspond to communication for the sending of a standard e-mail to the sender through server 108. Arrows 122 correspond to real-time messaging directly between client computer 104 and sender computer 106 as initiated according to the present invention.

Files similar to visible contacts file 110 and the approved contacts files 116 are stored on client computers (not shown) for all other members of the messaging system and are regularly communicated to messaging system server 102, which uses this information to determine what on-line status information is approved for sending to client computer 104 as part of a regular update to hidden contacts file 112. This communication is driven by the client application software running on each other member's computer. Such software is made compatible with the real-time messaging system standards for the specific messaging system running on server 102.

Messaging system 100 permits the client user to respond to an e-mail from the sender in two basic scenarios: the sending of a standard reply e-mail or the initiation of real-time messaging. In the first scenario, a sender has previously used sender computer 106 to send an e-mail message to the user of client computer 104, for example, using standard Internet e-mail protocols. The client user sends a standard e-mail reply, which is communicated to electronic mail server 108. The sender must generally take some action to specifically check for this reply using the sender's email client application, which is resident on sender computer 106.

In the second scenario, and according to the present invention, the client user may directly initiate real-time messaging with the sender, if the sender is currently on-line. Such real-time messaging avoids the delay or lag time inherent in the standard e-mail reply scenario described above. "Real-time messaging" as used herein generally includes all types of substantially real-time two-way communication between the client computer and the sender computer. However, it is possible that such real-time messaging may exhibit sporadic delays due to communication or heavy loads on a server or client computer in the communications path. It should be noted that real-time messaging involves direct communication between client computer 104 and sender computer 106, such as for example peer-to-peer communication. This is in contrast to standard e-mail communication which necessarily involves e-mail server 108. This direct communication generally permits interactive conversation by users through exchanged text or other forms of messages.

Figure 2:
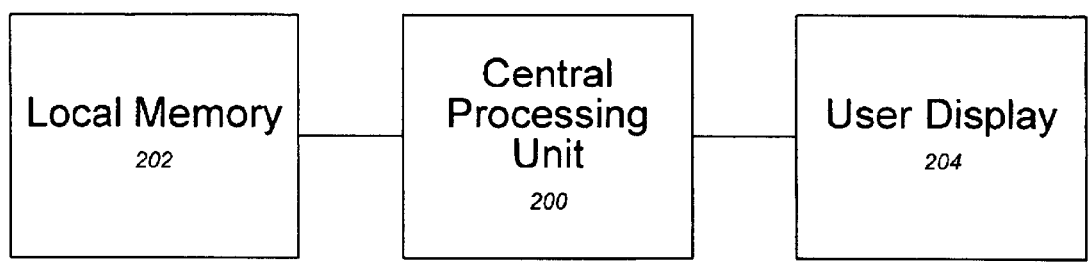
FIG. 2 is a block diagram illustrating a client computer of the messaging system of FIG. 1.

FIG. 2 is a block diagram illustrating client computer 104, which includes the conventional components of a local memory storage device 202, central processing unit 200, and user display device 204. Local memory storage device 202 is used, for example, to store visible contacts file 110, hidden contacts file 112, and e-mail application 105. User display device 204 is, for example, a monitor and displays the screen interfaces, such as for example the application windows, generated by e-mail client application 105 running on client computer 104.

Figure 3:
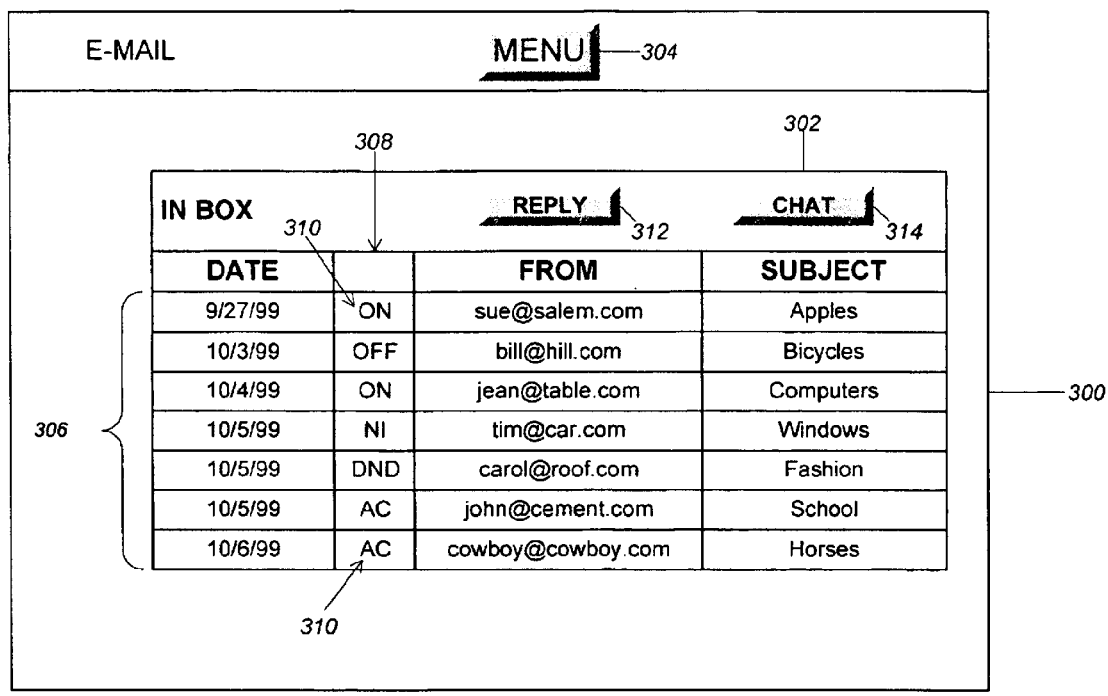
FIG. 3 illustrates an application window user interface for an e-mail client application running on the client computer of FIG. 2.

FIG. 3 illustrates an application window 300 displayed on user display device 204 as part of the user interface for e-mail client application 105 running on client computer 104. Window 300 includes an incoming message window 302, which is for example similar in basic structure, except as described below, to a conventional "in-box" for existing e-mail applications. Application window 300 includes a pull-down menu button 304 for accessing other functions of the program.

A list of incoming messages 306 is displayed in window 302 as sent by one or more senders from other computers such as sender computer 106. Information is listed for each e-mail including the date received, the name of the sender (which for example is the sender's e-mail address), and the subject matter of the e-mail. Window 302 also includes sender status column 308 to indicate the on-line status of each sender of an e-mail using status indicators 310, selected for example from the following states:

| STATUS INDICATOR | STATE |
|---|---|
| ON | on-line (sender is logged into the messaging system) |
| OFF | off-line (sender is not logged into the messaging system) |
| AC | accepting chat (sender welcomes real-time messaging initiation by the client user) |
| DND | do not disturb (sender does not want to engage in real-time messaging) |
| NI | no information available for this sender (sender is not a member of the messaging system) |

If the state of the sender corresponds to "ON" or "AC", then the client user is able to initiate a real-time messaging request to the sender. The state of "ON" indicates that the client user has logged into the messaging system. The state of "AC" indicates that the client user has logged into the messaging system and further has affirmatively taken action on sender computer 106 to indicate a desire, which is communicated from sender computer 106 to messaging system server 102, to receive requests for real-time messaging from the client user and other members of the messaging system. If the state is "OFF", then the sender is not currently on-line to the messaging system. If the state is "DND", then the client user is not able to initiate real-time messaging. If the state is "NI", then the sender is not a member of the messaging system, and messaging system server 102 will not have status information for this sender.

Incoming message window 302 includes an action initiator 312, such as a reply button or icon, for sending a reply e-mail to the sender and an action initiator 314, such as a chat button or icon, for engaging the sender in real-time messaging. Action initiators 312 and 314 may also be implemented as pull-down menu options or by other standard user selection approaches.

Messaging system server 102 (See FIG. 1) handles information collection and on-line status tracking for all members of messaging system 100. Each member may be tracked by server 102 using a conventional approach as used in a real-time messaging system. Generally, each member will use an application running on the member's computer that is compatible with the messaging system. It is not necessary that each member's application be identical to that of other members or incorporate on-line status indicators as discussed above. It is sufficient that the application have the general capability to engage in real-time messaging using a standard consistent with the e-mail application running on client computer 104 and that the application send the required member information to server 102 consistent with the standards for such information of the particular messaging system being used.

FIG. 4 illustrates an example of the contents of messaging system contacts file 114 as stored on messaging system server 102 of messaging system 100. The contents of file 114 includes the alias selected by each member (each of which is sometimes referred to herein as a contact) for unique identification of the member to other members of messaging system 100, the e-mail address of the member, and the contact status of the member as periodically determined by server 102 through routine communication with the member's messaging system client application running on the member's local computer. The status of each member corresponds to status indicators 310. As an example, server 102 may update the user information for each member each time such member executes the member's local client application and otherwise periodically, for example about every 5–15 minutes or as otherwise specified by the client user or the administrator of messaging system server 102.

Figure 5:
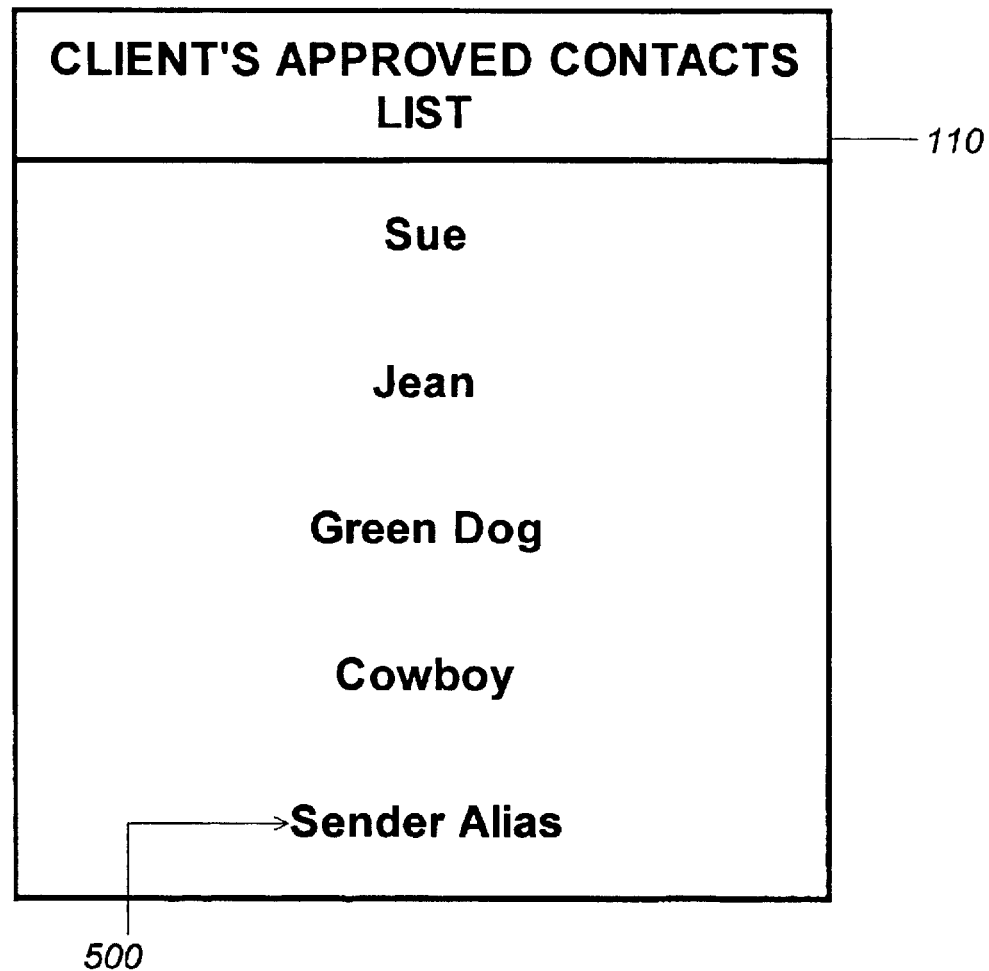
FIG. 5 illustrates the contents of a visible contacts file stored on the client computer of FIG. 2.

FIG. 5 illustrates an example of the contents of visible contacts file 110. As mentioned above, file 110 is the list of other members of messaging system 100 that have been selected by the client user as being approved contacts eligible to receive status information about the client user. Entry 500 is the alias of the sender and indicates that the client user has granted permission to the sender to obtain status information about the client user (the sender's and other members' obtaining of status information about the client user is not specifically discussed herein, but could be accomplished similarly as described for the client user using client computer 104).

Figure 6:
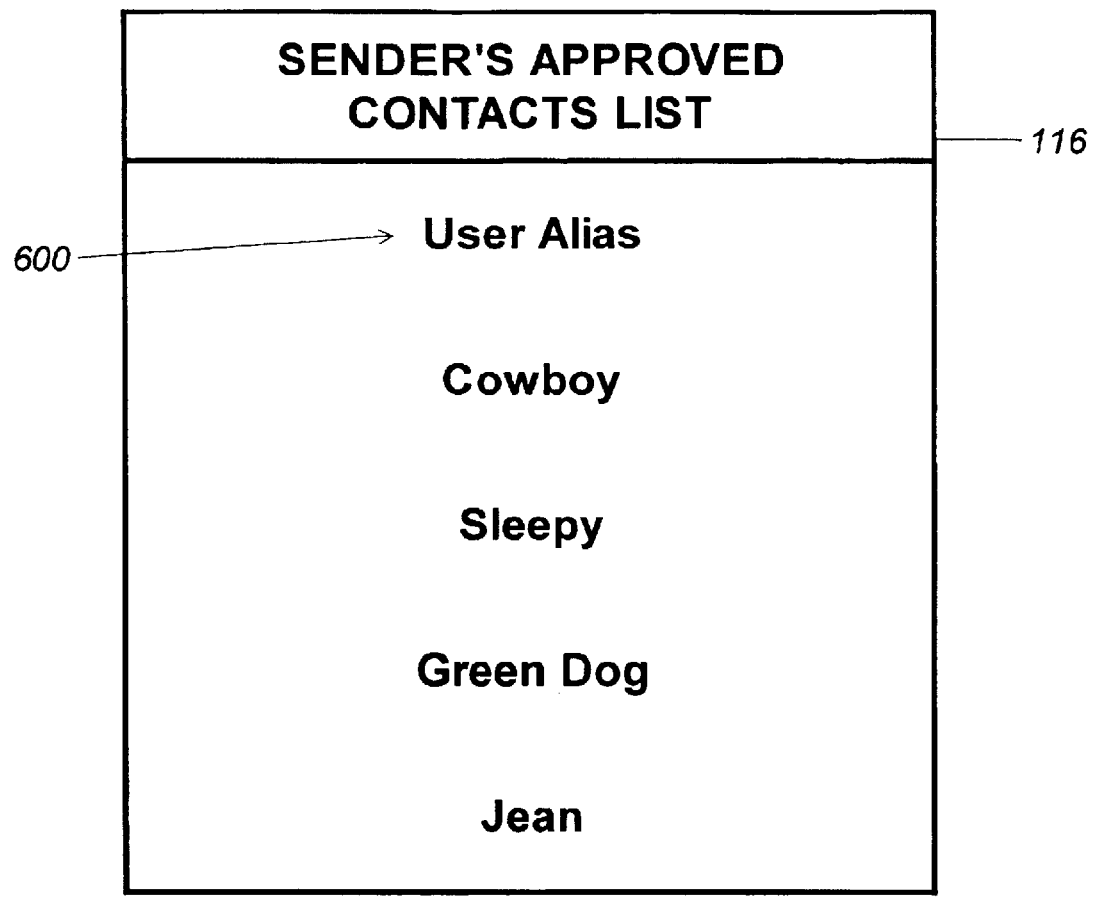
FIG. 6 illustrates the contents of an approved contacts file stored on a sender computer of the messaging system of FIG. 1.

FIG. 6 illustrates an example of the contents of approved contacts file 116, which is the list of other members of messaging system 100 that have been selected by the sender using sender computer 106 as being approved contacts eligible to receive status information about the sender. Sender computer 106 communicates the contents of file 116 to server 102. Client computer 104 communicates with server 102 to update hidden contacts file 112, which is updated with information about all senders, including the user of sender computer 106 that have included the client user as an approved contact eligible to receive sender status information. As an example, entry 600 is the alias selected by the client user and its being in file 116 indicates that the sender has provided permission for the client user to obtain the sender's status information. Thus, status and other information regarding the sender will be incorporated in one or more updates made to hidden contacts file 112 by server 102 such that a status indicator 310 corresponding to the state of the sender as recorded in contacts file 114 will be displayed in incoming message window 302.

Figure 7:
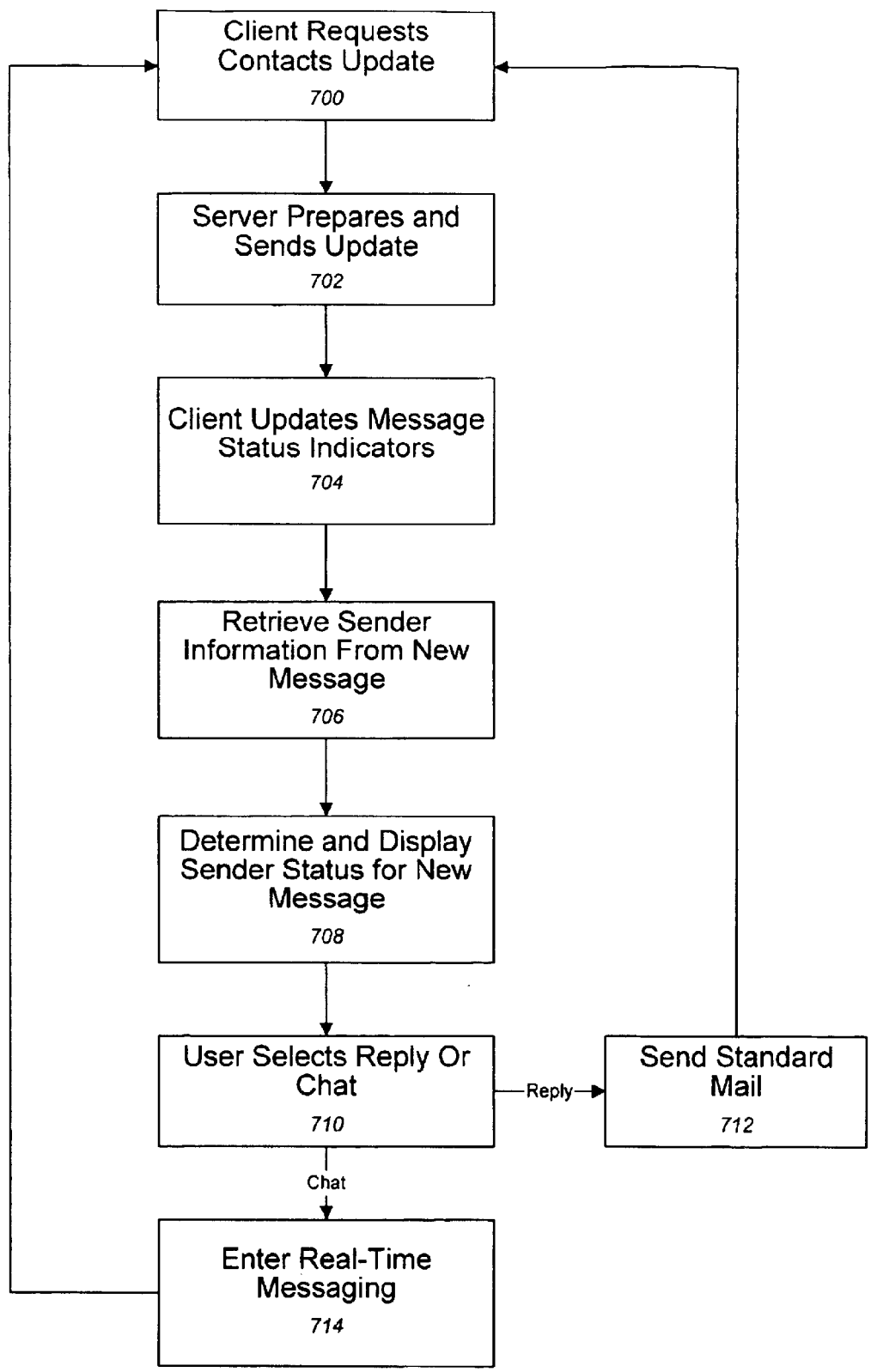
FIG. 7 is a flow diagram representing a method according to the present invention of operating an e-mail application running on the client computer of FIG. 2.

FIG. 7 is a flow diagram representing a method according to the present invention of operating e-mail application 105 on client computer 104. E-mail application 105 can be implemented using one of many conventional computer programming languages compatible with client computer 104. In step 700, e-mail application 105 requests a contacts update from server 102. This request occurs periodically as mentioned above, and also preferably occurs upon initial execution of the application. It should be noted that although step 700 is indicated as an initial step, it is not necessary that step 700 be the first step performed when the application is launched. Rather, FIG. 7 represents a process flow that is regularly repeated in many cycles, and that may be alternatively initiated at the time of launching the application with other steps such as, for example, step 704.

In step 702, messaging system server 102 determines the member information to be sent to client computer 104. This information is stored in hidden contacts file 112. Server 102 generates the appropriate information to send by comparing messaging system contacts file 114 with approved contacts file 116 and all other such contacts files for other senders in order to determine which senders have given the client user permission to learn their on-line status. The information so generated is periodically transmitted to client computer 104. Note that hidden contacts file 112 will contain information for all senders of e-mail to client computer 104 even if such senders are not listed in visible contacts file 110. Thus, the client user may determine the status of senders even if they are not included in visible contacts file 110. It should be noted, however, that such unlisted senders will not be able to receive information from server 102 regarding the on-line status of the client user. An option that may be alternatively incorporated into e-mail application 105 is the automatic inclusion of the appropriate selected alias for every such sender, which is not already listed in visible contacts file 110, upon receipt of an e-mail from such sender.

In step 704, e-mail application 105 updates sender status column 308 of incoming message window 302 for all incoming messages 306 currently listed in window 302. Hidden contacts file 112 contains information for each sender including the e-mail address and contact status transmitted by server 102 from contacts file 114. For each message 306, the e-mail address of the sender is compared to the e-mail addresses in hidden contacts file 112. For each corresponding match, the contact status information from file 112 is used to determine the status indicator 310 that is displayed. If a sender's e-mail address is not found in file 112, then the status indicator 310 indicates that no information is available regarding the status of such sender. The client application will, for example, update status indicators 310 about every 5 to 15 minutes.

In step 706, the e-mail address of the sender of each newly-received e-mail is obtained by parsing the header of the e-mail. The address is then compared to hidden contacts file 112. Also, as each new e-mail message is received by e-mail application 105, the corresponding on-line sender status information for such e-mail is updated and indicated in incoming message window 302 at the time the new e-mail is included in the list of incoming messages 306.

In step 708, if the sender's e-mail address for such new message is listed in file 112, then the client application provides an appropriate status indicator 310 corresponding to the state of such sender contained in file 112. If such sender's e-mail address is not contained in file 112, then status indicator 310 indicates that no information is available.

The client user may conveniently respond to any sender listed in window 302 using a standard reply e-mail by selecting action initiator 312, for example, using a mouse pointing device. If status indicator 310 for such sender indicates a state in which the sender is may accept real-time messaging, for example, the states of "ON" and "AC", then the user can initiate real-time messaging with the sender by selecting action initiator 314, for example, using a mouse pointing device.

In step 712, if the user chooses to send a standard reply e-mail, then the client application prepares and sends a reply using conventional Internet protocols. In step 714, if the user initiates real-time messaging, then the client application initiates real-time messaging directly with sender computer 106.

Regardless of whether the user selects to send a reply e-mail or to initiate real-time messaging, as mentioned above, the client application will continue to cycle through the process flow illustrated in FIG. 7. Specifically, in step 700, the client application will continue to regularly request contacts updates from server 102.

The types of information sent back and forth between client computer 104 and messaging system server 102 during the operation of the method above will depend on the particular method of communication implemented. For example, client computer 104 may send a periodic request to messaging system server 102 for the receipt of changes that have occurred since the client computer's last request. This request could also include a request for any new messages intended for the client. Additional information that may be sent to the server may include any changes the client user has made to his or her status or to visible contacts file 110. However, it is preferred that the client computer update the server at the time of any change in the client user's status or to visible contacts file 110. With this preferred approach, the client user does not have to wait until the next periodic request to the server in order for changes in status or visible contacts to become effective in the messaging system.

The messaging system and method of operation as described above will work in general in conjunction with any generic real-time or instant messaging system, such as Valent Software's NETCLUBS system. Also, the e-mail client application computer program product according to the present invention may be distributed in many standard ways including sending as stored on conventional media such as a CD-ROM, a floppy disk, or an optical disk or by downloading from a memory storage device on a server set up for downloading the computer program to a customer's computer over a conventional communications link. The e-mail application may be installed and stored on a customer's computer on a standard storage medium such as a fixed hard drive or a removable hard drive. The computer program product of the present invention is intended to cover all such computer-readable storage media and devices.

Figure 8:
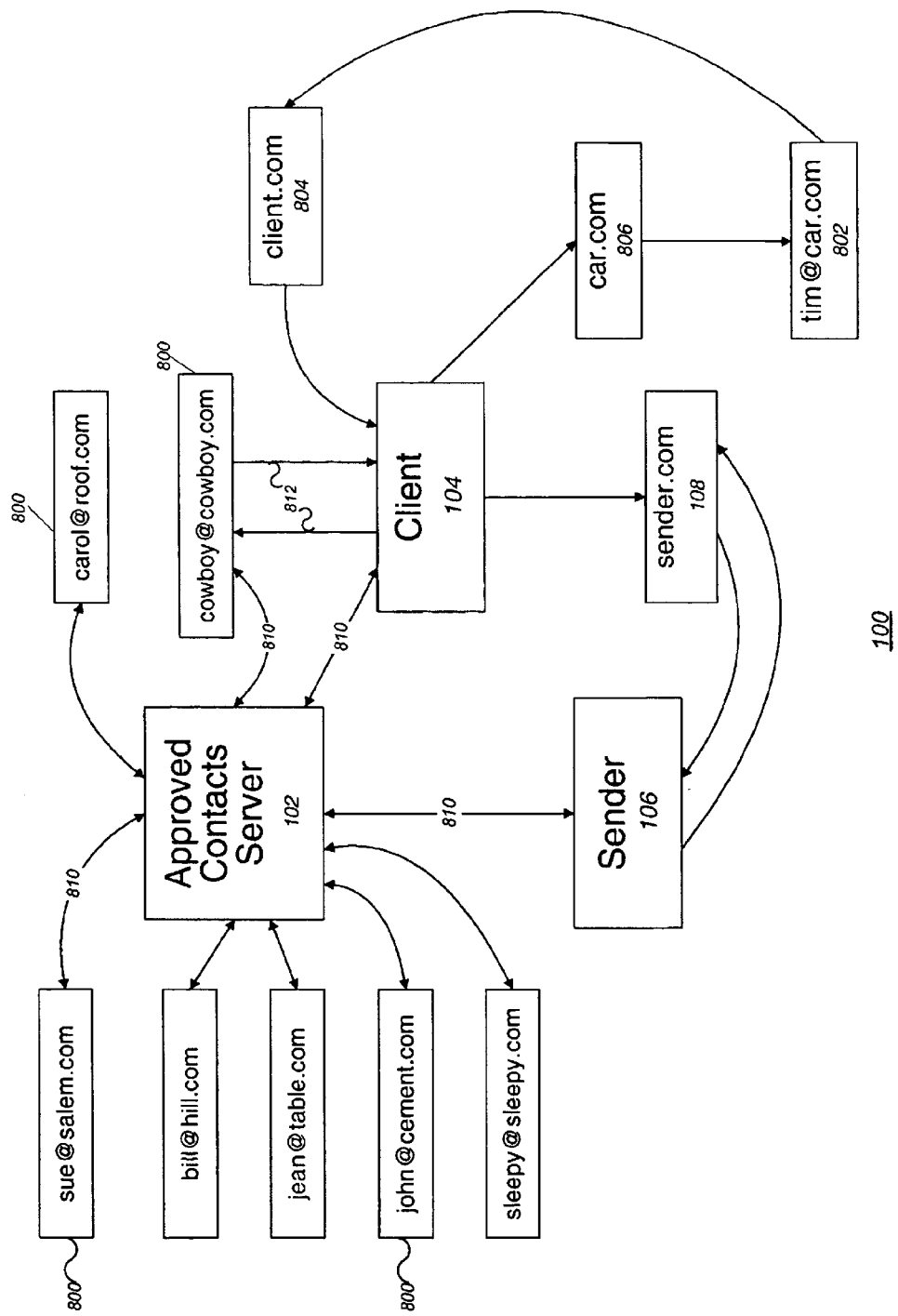
FIG. 8 illustrates a specific example of an implementation of the messaging system according to the present invention.

FIG. 8 illustrates an example of messaging system 100 for a set of specifically-identified members of messaging system 100. As shown in FIG. 8, messaging system 100 includes several members indicated as internal contacts 800. Each internal contact 800 is in regular communication with messaging system server 102, as indicated by arrows 810. The user of client computer 104 and the user of sender computer 106 are also members of messaging system 100 and thus included in the group of internal contacts 800. The client user of client computer 104 may respond to e-mail messages sent by any of internal contacts 800.

Not all senders of e-mails will be included in the group of internal contacts 800. An external contact 802, which is not in communication with server 102, may also send an e-mail to client computer 104 through e-mail server 804. The client user may respond to external contact 802 using standard reply e-mail sent through e-mail server 806. The client user will not have on-line status information for external contact 802.

The client user will be able to obtain on-line status information for any of internal contacts 800 if such contacts have included the client user on their respective approved contacts file. The client user may initiate real-time messaging as described above with internal contacts 800 as represented for one such contact by arrows 812.

By the foregoing, a novel and unobvious messaging system and method for real-time messaging that permits a client user to determine in a single user interface application window the on-line status of senders who have sent e-mail messages to the user has been disclosed by way of preferred embodiments.

Other Variations

Although specific embodiments have been described above, numerous modifications and substitutions may be made without departing from the spirit of the invention. For example, the above invention could be incorporated as an add-in computer program to an existing e-mail application lacking the features of the present invention as described herein. This could be done, for example, through an application program interface provided by the creator of the e-mail application. Accordingly, the invention has been described by way of illustration rather than limitation.

What is claimed is:

1. A computer program product for operating an electronic mail application on a first computer, comprising:
   a computer-readable storage medium including computer-readable program code for operation on the first computer and embodied in the storage medium, wherein the operation of the computer-readable program code comprises:
   accepting an incoming electronic mail message sent by a sender using a second computer, wherein the incoming electronic mail message is one of a plurality of electronic mail messages listed in the display;
   providing a user interface, wherein the user interface comprises a message display including information regarding the incoming electronic mail message; and
   displaying a status of the sender in the display, wherein displaying the status comprises providing a status indicator in the display for each of the plurality of electronic mail messages.

2. The computer program product of claim 1 wherein the storage medium is selected from the group consisting of a CD-ROM, a floppy disk, a fixed hard drive, a removable hard drive, an optical disk, and a server storage device for downloading the computer program product to a customer computer over a communications link.

3. The computer program product of claim 1 wherein the electronic mail message comprises information regarding the subject of the electronic mail message.

4. The computer program product of claim 1 wherein providing the user interface comprises providing a user interface for an electronic mail application running on the first computer and wherein the message display is an incoming message window for electronic mail.

5. A computer program product for operating an electronic mail application on a first computer, comprising:
   a computer-readable storage medium including computer-readable program code for operation on the first computer and embodied in the storage medium, wherein the operation of the computer-readable program code comprises:
   accepting an incoming electronic mail message sent by a sender using a second computer;
   providing a user interface, wherein the user interface comprises a message display including information regarding the incoming electronic mail message; and
   displaying a status of the sender in the display, wherein displaying the status comprises indicating at least one of the states selected from the group consisting of an on-line state, an off-line state, a do-not-disturb state, and an accepting real-time messaging state.

6. A computer program product for operating an electronic mail application on a first computer, comprising:
   a computer-readable storage medium including computer-readable program code for operation on the first computer and embodied in the storage medium, wherein the operation of the computer-readable program code comprises:
   accepting an incoming electronic mail message sent by a sender using a second computer;
   providing a user interface, wherein the user interface comprises a message display including information regarding the incoming electronic mail message;
   displaying a status of the sender in the display; and
   providing a messaging initiator in the display to initiate real-time messaging with the sender.

7. The computer program product of claim 6 wherein the operation of the computer-readable program code further comprises providing a reply initiator in the display for initiating the creation of a reply electronic mail message addressed to the sender.

8. A computer program product for operating an electronic mail application on a first computer, comprising:
   a computer-readable storage medium including computer-readable program code for operation on the first computer and embodied in the storage medium, wherein the operation of the computer-readable program code comprises:
   accepting an incoming electronic mail message sent by a sender using a second computer:
   providing a user interface, wherein the user interface comprises a message display including information regarding the incoming electronic mail message;
   displaying a status of the sender in the display;
   determining the electronic mail address of the sender; and
   comparing the electronic mail address of the sender with a list of messaging system contacts to determine the sender state of the status indicator.

9. The computer program product of claim 8 wherein the list of messaging contacts is maintained by a messaging system contacts server.

10. A messaging system for indicating a status of a sender of an electronic mail message, comprising:
    a client computer; and
    an electronic mail application, running on the client computer, for receiving the electronic mail message and comprising a user interface to display information regarding the electronic mail message, wherein the user interface indicates the status of the sender, wherein the status comprises at least one state selected from the group consisting of an on-line state, an off-line state, a do-not-disturb state, and an accenting real-time messaging state.

11. The messaging system of claim 10 further comprising a messaging system server in communication with the client computer.

12. A messaging system for indicating a status of a sender of an electronic mail message, comprising:
    a client computer; and
    an electronic mail application, running on the client computer, for receiving the electronic mail message and comprising a user interface to display information regarding the electronic mail message, wherein the user interface indicates the status of the sender and comprises an incoming message window, the electronic mail message is one of a plurality of electronic mail messages listed in the incoming message window, and the incoming message window comprises a messaging initiator to initiate real-time messaging with the sender.

13. The messaging system of claim 12 wherein the incoming message window further comprises a reply initiator to initiate the creation of a reply electronic mail message addressed to the sender.

14. A messaging system for indicating a status of a sender of an electronic mail message, comprising:

a client computer;

an electronic mail application, running on the client computer, for receiving the electronic mail message and comprising a user interface to display information regarding the electronic mail message, wherein the user interface indicates the status of the sender; and a messaging system server in communication with the client computer, wherein:

the electronic mail application determines the electronic mail address of the sender;

the messaging system server maintains a list of messaging system contacts; and the electronic mail application compares the electronic mail address of the sender with at least a portion of the list of messaging system contacts to determine the status of the sender.

15. The messaging system of claim 14 further comprising a hidden contacts file stored on the client computer wherein the hidden contacts file is updated by repeated transmissions of at least a portion of the list of messaging system contacts to the client computer.

16. The messaging system of claim 14 further comprising a sender computer, for use by the sender, in communication with the messaging system server.

17. The messaging system of claim 16 wherein the status of the sender is determined by the messaging system server and stored in the list of messaging system contacts.

18. The messaging system of claim 17 further comprising an approved contacts file stored on the sender computer wherein the messaging system server receives the approved contacts file to determine if the client computer is authorized to receive the state of the sender.

19. A method of using an electronic mail application running on a client computer, comprising:

providing an incoming messages window;

receiving an electronic mail message from a sender;

displaying an indication of receipt of the electronic mail message in the incoming messages window;

determining a state of the sender; and displaying a status indicator, corresponding to the state of the sender, in the incoming messages window, wherein displaying the status indicator comprises indicating at least one of the states selected from the group consisting of an on-line state, an off-line state, a do-not-disturb state, and an accepting real-time messaging state.

20. A method of using an electronic mail application running on a client computer, comprising:

providing an incoming messages window;

receiving an electronic mail message from a sender;

displaying an indication of receipt of the electronic mail message in the incoming messages window;

determining a state of the sender; and displaying a status indicator, corresponding to the state of the sender, in the incoming messages window, wherein displaying the status indicator comprises displaying the status indicator at a location in the incoming messages window corresponding to the location of the indication of receipt of the electronic mail message.

21. A method of using an electronic mail application running on a client computer, comprising:

providing an incoming messages window;

receiving an electronic mail message from a sender;

displaying an indication of receipt of the electronic mail message in the incoming messages window;

determining a state of the sender; and displaying a status indicator, corresponding to the state of the sender, in the incoming messages window, wherein determining the state of the sender comprises comparing sender information obtained from the electronic mail message with a list of a plurality of contacts, wherein each of the plurality of contacts is a member of a messaging system.

22. The method of using the electronic mail application of claim 21 further comprising communicating with a messaging system server to access the list of the plurality of contacts.

23. The method of using the electronic mail application of claim 22 further comprising:

storing at least a first portion of the list of plurality of contacts on the client computer in a first contacts file; and updating the first contacts file by receiving repeated transmissions from the messaging system server.

24. The method of using the electronic mail application of claim 23 further comprising contacting the messaging system server to update the first contacts file, wherein contacting the messaging system is initiated by receipt of the electronic mail message.

25. The method of using the electronic mail application of claim 23 wherein the first contacts file is hidden from a user of the client computer and further comprising storing at least a second portion of the list of plurality of contacts on the client computer in a second contacts file, wherein the second contacts file is visible to the user and comprises a list of approved contacts authorized by the user.

* * * * *